(12) United States Patent
Sølling

(10) Patent No.: US 9,607,661 B2
(45) Date of Patent: Mar. 28, 2017

(54) STORAGE CASE

(71) Applicants: SCANAVO A/S, Taastrup (DK); SCAVANO MANUFACTURING HK LTD., Hong Kong (CN)

(72) Inventor: Tino Sølling, Taastrup (DK)

(73) Assignees: SCANAVO MANUFACTURING HK LTD, Sheung Wan (HK); SCANAVO A/S, Taastrup (DK)

( * ) Notice: Subject to any disclaimer, the term of this patent is extended or adjusted under 35 U.S.C. 154(b) by 2 days.

(21) Appl. No.: 14/775,262

(22) PCT Filed: Aug. 27, 2013

(86) PCT No.: PCT/DK2013/000052
§ 371 (c)(1),
(2) Date: Sep. 11, 2015

(87) PCT Pub. No.: WO2014/139530
PCT Pub. Date: Sep. 18, 2014

(65) Prior Publication Data
US 2016/0035393 A1 Feb. 4, 2016

(30) Foreign Application Priority Data

Mar. 14, 2013 (DK) .................. 2013 00144

(51) Int. Cl.
*B65D 85/00* (2006.01)
*G11B 33/02* (2006.01)
*G11B 33/04* (2006.01)
*B65D 6/00* (2006.01)
*B65D 6/10* (2006.01)
*B65D 6/16* (2006.01)

(52) U.S. Cl.
CPC ............ *G11B 33/025* (2013.01); *B65D 11/10* (2013.01); *B65D 11/16* (2013.01); *B65D 11/18* (2013.01); *G11B 33/04* (2013.01)

(58) Field of Classification Search
USPC ................... 206/308.1, 311, 312, 313, 459.5
See application file for complete search history.

(56) References Cited

U.S. PATENT DOCUMENTS

| 4,153,154 A | 5/1979 | Ruscher |
| 5,040,680 A * | 8/1991 | Wilson ............... B65D 83/0805 206/438 |
| 5,799,782 A * | 9/1998 | Gelardi ............. G11B 33/0405 206/1.5 |

(Continued)

FOREIGN PATENT DOCUMENTS

| WO | WO 2011/018593 A1 | 2/2011 |
| WO | WO 2011/127784 A1 | 10/2011 |

*Primary Examiner* — Jacob K Ackun
(74) *Attorney, Agent, or Firm* — Birch, Stewart, Kolasch & Birch, LLP

(57) ABSTRACT

The invention relates to a storage case comprising two parts, each with an outer side and an inner side, where a side area on each part may comprise a connecting element for hinged connection with the other part, where at least one of the two parts on the outer side comprises a circumferential frame connectable with the part and with a central aperture and where further a display element is positioned on the outer side of the at least one part and interlocked between the outer side and the frame connectable to the part.

16 Claims, 10 Drawing Sheets

(56) References Cited

U.S. PATENT DOCUMENTS

| | | |
|---|---|---|
| 6,510,631 B1 | 1/2003 | Baggarly |
| 2003/0230514 A1 | 12/2003 | Baker |
| 2005/0145514 A1* | 7/2005 | Gelardi .................... B42B 5/06 206/308.1 |
| 2005/0167302 A1* | 8/2005 | Bjerregaard ....... G11B 33/0427 206/308.1 |
| 2006/0021899 A1 | 2/2006 | Bjerregaard et al. |
| 2009/0065374 A1 | 3/2009 | Au |
| 2014/0291188 A1* | 10/2014 | Maddox ............... B65D 55/028 206/459.1 |

* cited by examiner

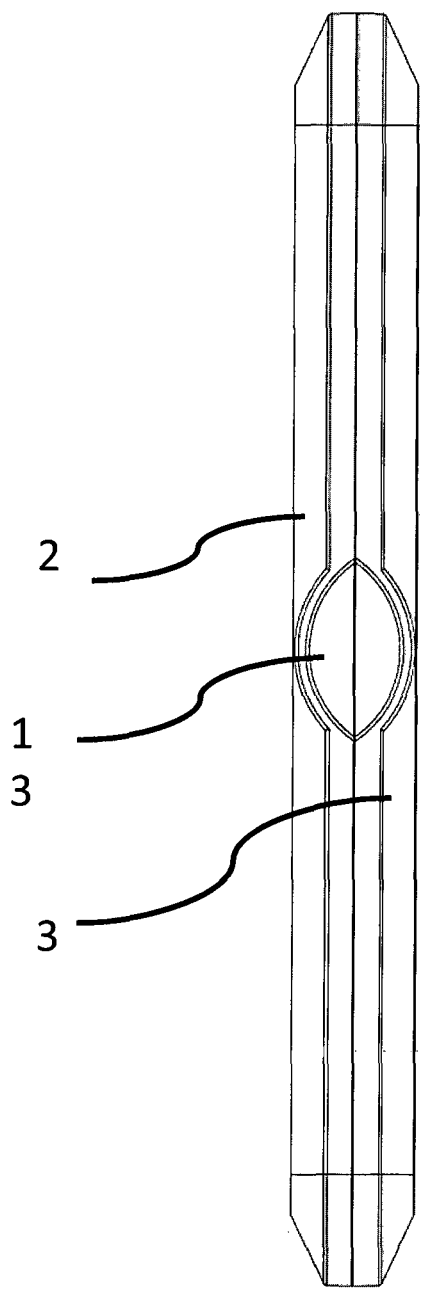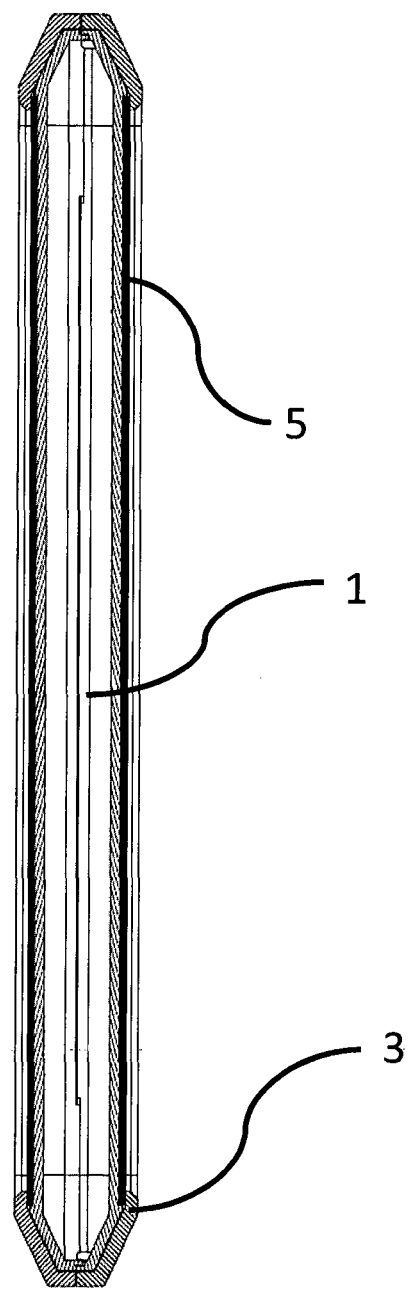
FIG. 6A
FIG. 6B

STORAGE CASE

FIELD OF THE INVENTION

The invention relates to storage cases, more particular to storage cases adapted for accommodation of retail goods and similar items, often with a relatively small size. One area of use is the area of data carrier storage, however other content for storage may be foreseen and the invention is not limited to the storage of such data carriers.

BACKGROUND FOR THE INVENTION

In for example the area of data carrier storage (CD's, DVD's and similar for movies, computer programs, music etc.) a great variety of storage cases is known. In this field it is well known to use storage cases comprising a front part and a rear part interconnected with a back part, where the front part and the back part at their connection with the back part are closable to form a hollow enclosure. On the outside a layer of film is typically used to hold a sheet of information material or display against the front part, the back part and rear part.

This previously known way of presenting the content of the storage case is generally including placing a plain sheet of printed paper in the space between the film and the respective parts.

SUMMARY OF THE INVENTION

The objective of the present invention is thus to provide a storage case, which may provide more options for display on the storage case and at the same time may be flexible in terms of the required machinery for production of the display element.

According to the invention this is achieved through a storage case comprising a base part with two side elements, each with an outer side and an inner side, where on at least one of the two side elements on the outer side a circumferential holding frame is provided connected with the side element and with a central aperture and where further a display element is positioned on the outer side of the at least one side element and interlocked between the outer side of the at least one side element and the holding frame connectable to the side element.

Preferably the holding frame and the storage case side element are mutually connected by means of a number of mechanical locking mechanisms, such as taps and grooves, which are preferably located on one side along the circumference of the outer side of the side element and on the other side on the holding frame. Other locations of the locking mechanisms are possible without deviating from the principles of the invention.

Advantageously the storage case side element comprises a number of taps and where the holding frame comprises a number of corresponding grooves adapted to accommodate the taps. The taps may alternatively be provided on the holding frame and the grooves on the side element.

Advantageously the storage case parts comprises an at least substantially circumferential lip with a dimension allowing the frame with a corresponding lip part on the side facing the storage case part to snap lock with storage case part.

Preferably the interconnection between the storage case part and the holding device is releasable. This is advantageously achieved by that on the inner side of at least one of the two parts one or more locking elements are provided that allow release of the two elements through a slight deformation of one or both of the two elements. Alternatively the two parts may be permanently connected through a welding or gluing process.

In one embodiment one or more holding clips are provided on the inner side of at least one of the two parts, adapted for spring action fixation of an inlay material, e.g a booklet or similar.

Advantageously the storage case comprises two holding frames, one for each side element. Hereby a display may be provided on both sides of the storage case.

In one embodiment the two side elements of the base element are mutually connected along a side of the two elements, to be foldable to form a storage enclosure. However two individual elements is an option that may even allow usage of a broader selection of materials for the production of the side elements. Two different materials may also be foreseen. In both embodiments, i.e. the connected side element and the two individual side elements, locking means are preferably provided for holding the two side elements together to form the enclosure for packaging of a product. These locking means may be of any kind fulfilling the purpose.

The invention further relates to a holding frame for use in a storage case as described above. Preferably the holding frame comprises a circumferential frame with a central aperture and further locking elements adapted for mutually engaging with corresponding locking elements on a storage case side element.

Preferably guide element or taps are provided for engagement with guide apertures in a display element to be held by the holding frame, or simply the sides of the display element. The central aperture in the frame may include a transparent cover attached to the holding frame.

The invention further relates to a display element for use in a storage case as described above. The display element is preferably adapted to engage with the holding device to take a fixed position between the storage case part and the holding device.

Advantageously one or more guide areas, e.g. apertures, are provided in the display device adapted to correspond with guide taps in the holding device or the storage case part.

The display element is designed to fit with the holding device and the storage case base part on which the holding frame is mounted to firmly hold the display element.

The display element may be provided with guide means that will ensure the correct location and maintaining the display element in place.

The invention will be explained in further detail in the following description of a preferred embodiment of the invention, with reference to the drawing, where:

DESCRIPTION OF THE DRAWINGS

FIG. 6A and FIG. 6B shows a storage case in a side view and further in a sectional view along the line G-G in FIG. 2;

DESCRIPTION OF A PREFERRED EMBODIMENT

Figure 1A:
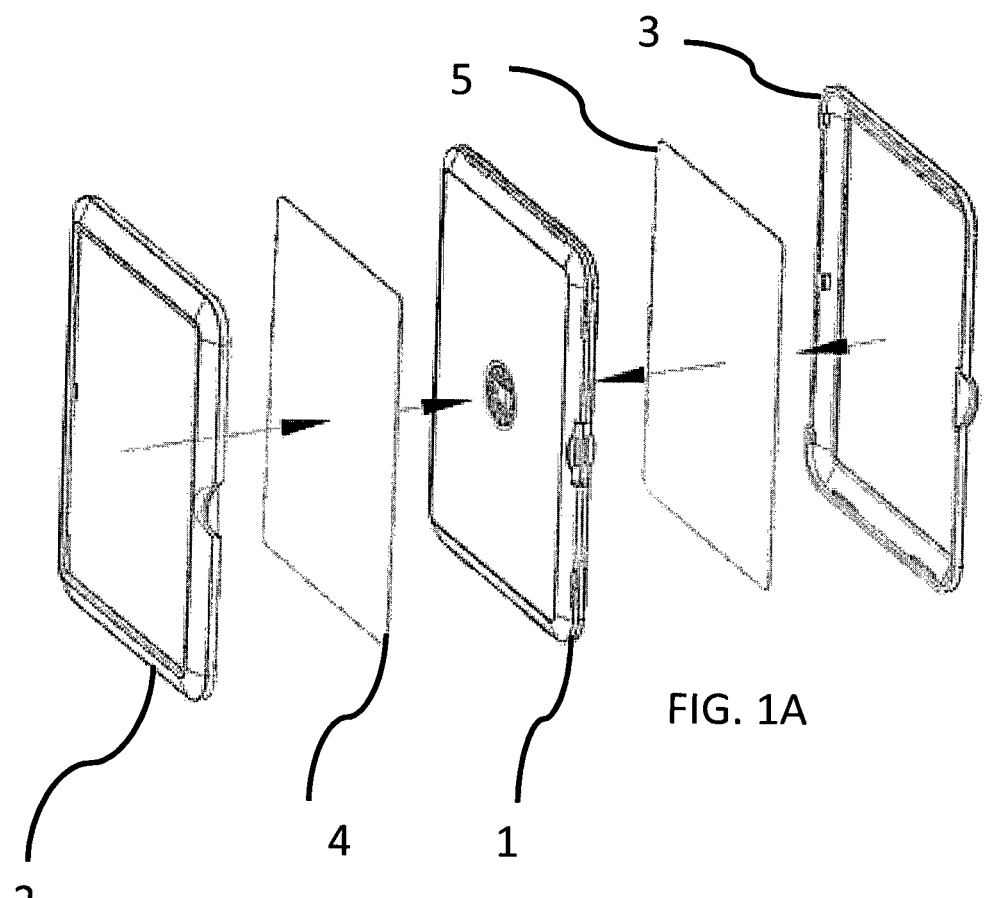
FIG. 1A and FIG. 1B shows a storage case according to the invention in an exploded perspective view and further in an assembled view.
Figure 1B:
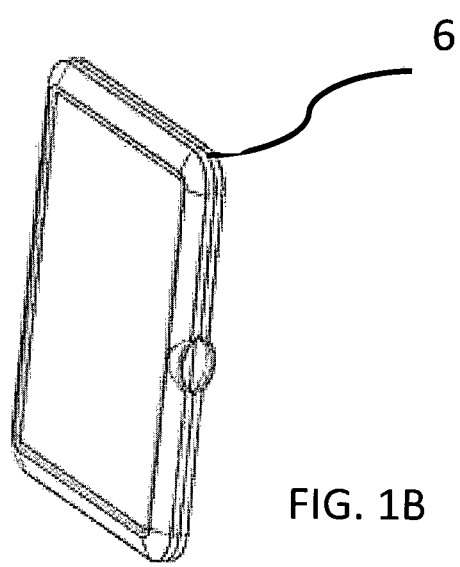

From FIG. 1A an exploded view of the invention appears, where the individual components of the invention are visible and where the directions for assembling the various elements are indicated by arrows and where the assembled storage case 6 appears from FIG. 1B. The embodiment shown comprises a base part 1 having two side elements 8,9, which are mutually connected by means of a hinge part 10 (shown in detail in FIG. 3A). Two holding frames 2,3 are provided, adapted for connection with the side elements 8,9 of the base part 1 and further two display elements 4,5 are provided, adapted for placement on the side elements and for being held in place by a holding frame. The holding frames 2,3 and the side elements 8,9 of the base part 1 will be explained in more detail in the following description.

Figure 2:
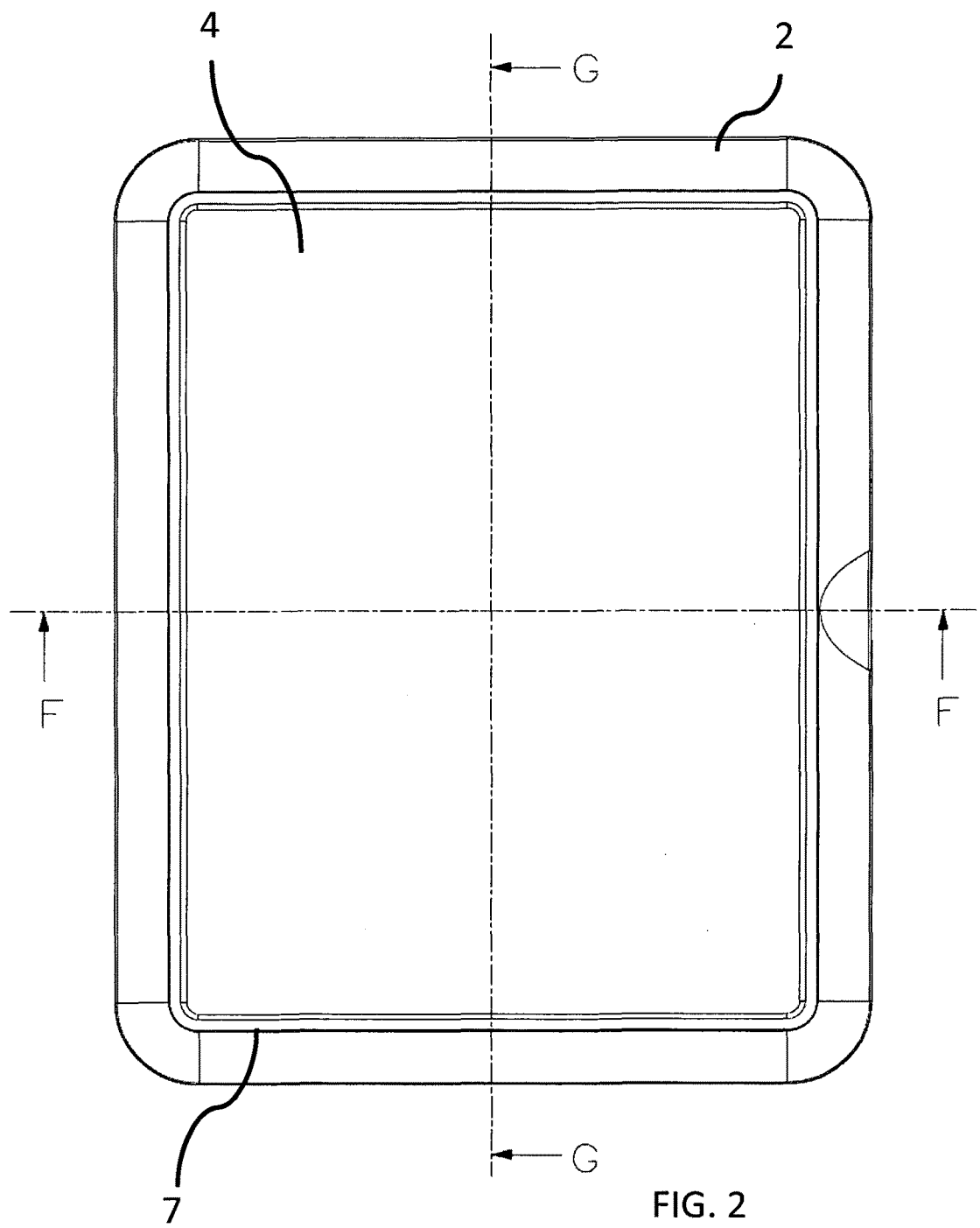
FIG. 2 shows a storage case according to the invention in a closed position.

From FIG. 2 the storage case according to the invention appears in a planar view where the outside of the storage case is visible. The front part comprises a holding frame 2 and a display element 4 held by the holding frame 2. The holding frame is connected to the front part 8 of the storage case by means of a snap lock mechanism, which will be explained further in connection with FIG. 9. Between the holding frame and the front part of the storage case the display 4 element is firmly held in place at the rim area 7 of the holding frame 2 and is visible through the central opening of the holding frame.

Figure 3A:
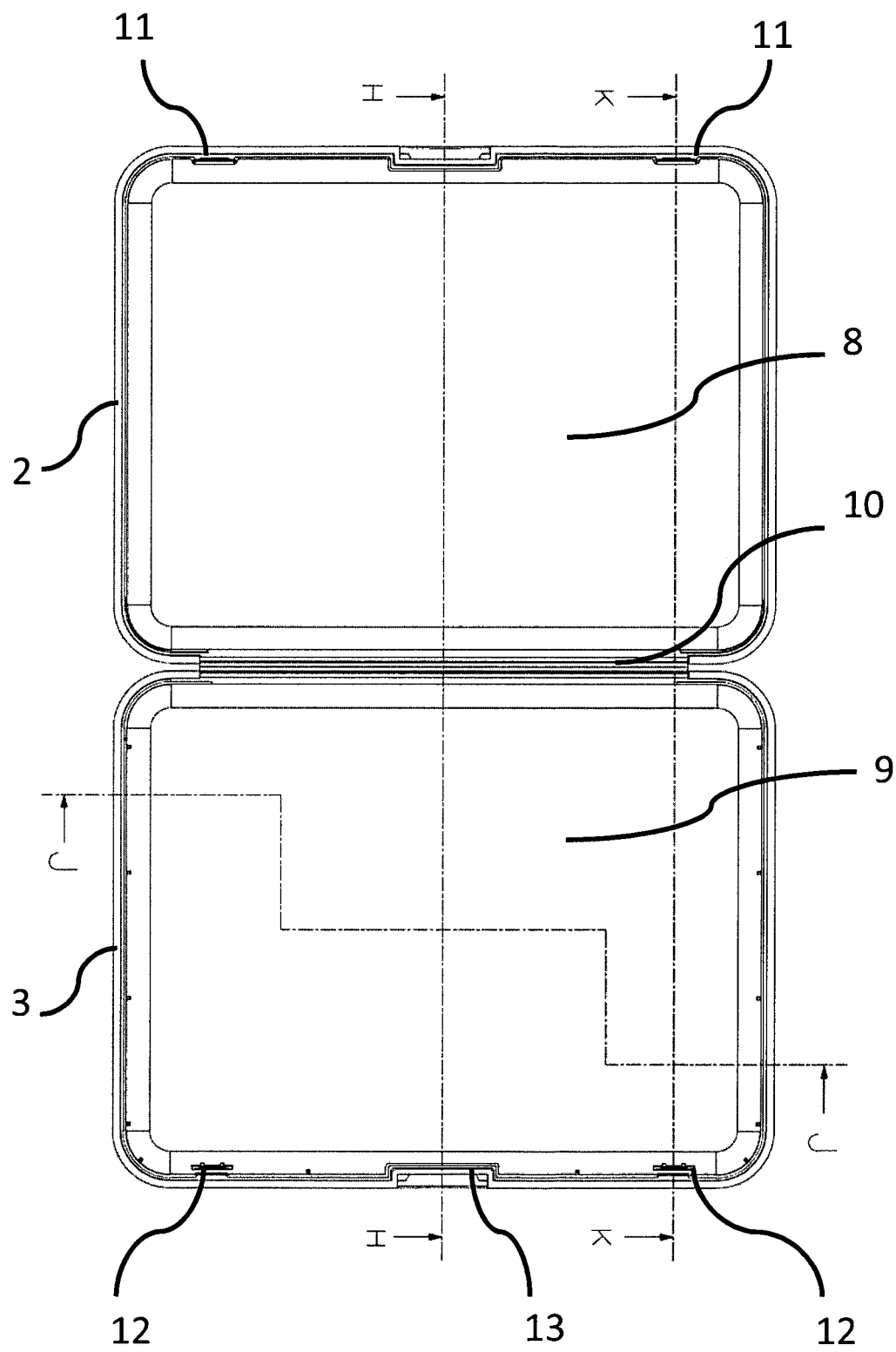
FIG. 3A and FIG. 3B shows a storage case according to the invention in an inside view.
Figure 3B:
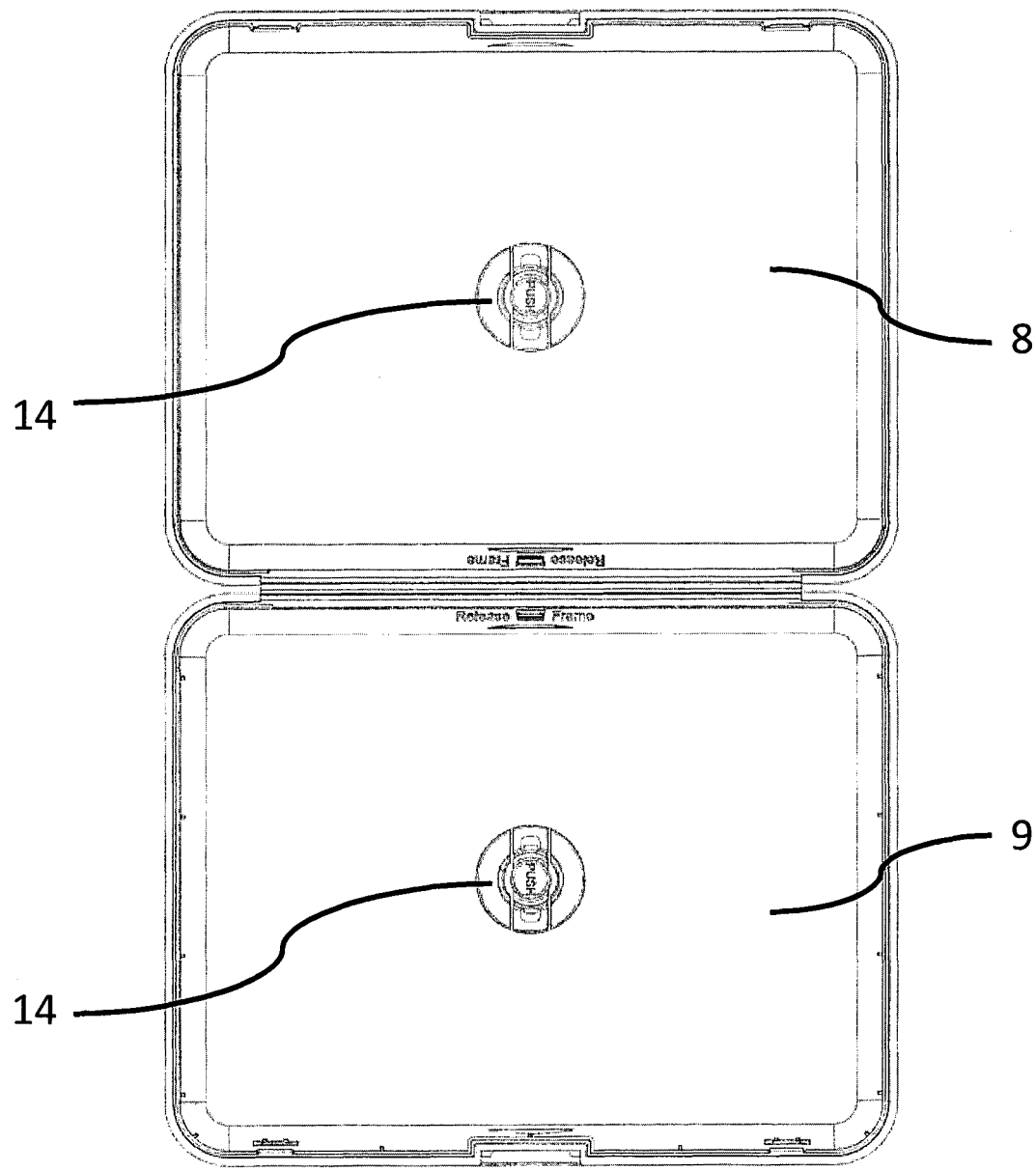

From FIG. 3A the storage case according to the invention appears in a planar view where the inside of the storage case is visible. The storage case comprises a front part 8 and a rear part 9, also called side elements, which have an essentially rectangular shape and which are mutually connected with a hinge part 10 along a side area of the side elements, respectively. The parts 8,9 are foldable at the hinge 10 to form a hollow enclosure and are held together by releasable locking means 11,12. FIG. 3B shows a similar storage case with two holding devices for media discs. The invention is not limited to such use, but may obviously be used for storage of such products.

Figures 4A, 4B:
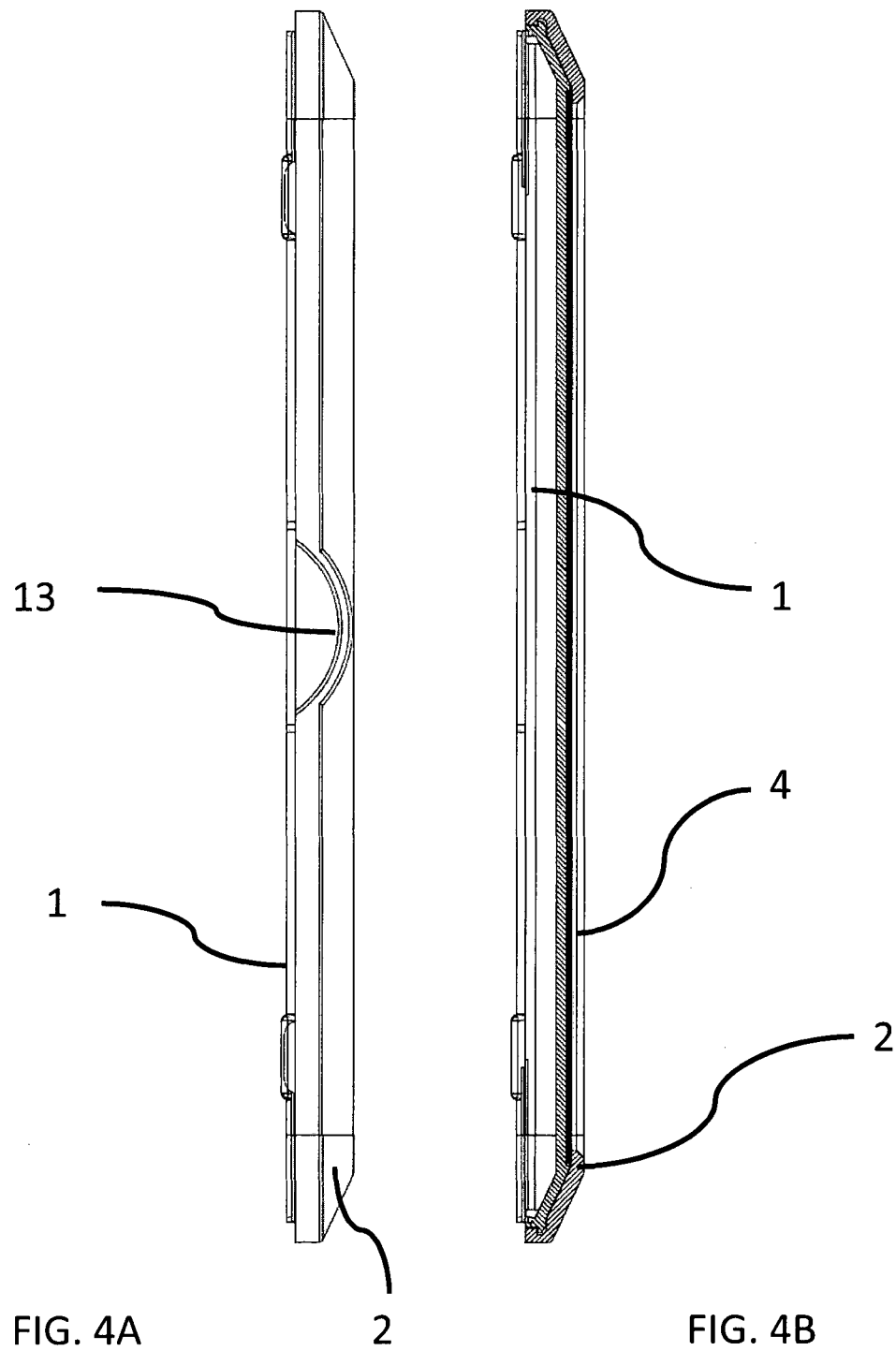
FIG. 4A and FIG. 4B shows a storage case according to the invention in a side view in an open position and in a cross sectional view along the line J-J in FIG. 3A.

From FIG. 4A the storage case appears seen in a side view with a holding frame mounted on the side part. From FIG. 4B the base part 1, the holding frame 2 and the display element 4 are visible. A griping area 13 is provided for opening the storage case.

Figure 5C:
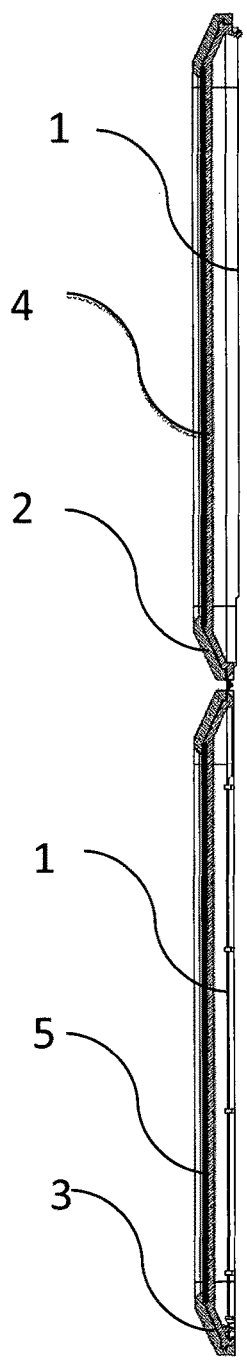
FIG. 5B and FIG. 5C in cross sectional views along the lines H-H and K-K in FIG. 3A.
Figure 5B:
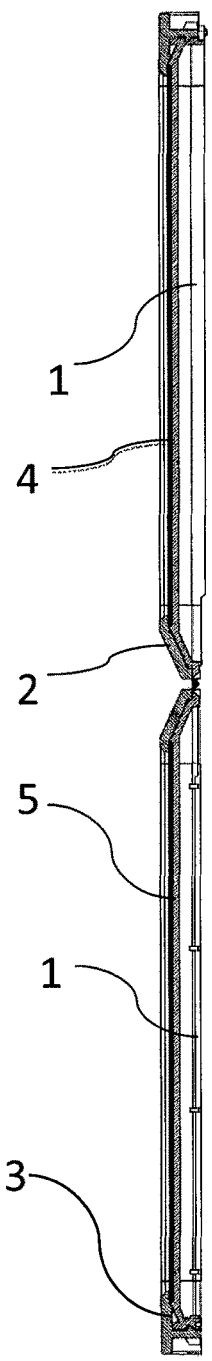
Figure 5A:
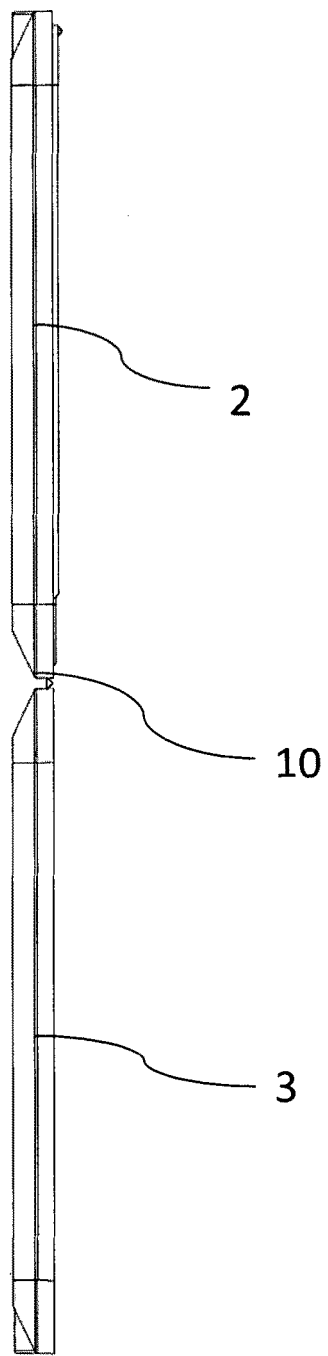
FIG. 5A shows a storage case according to the invention in an end view.

From FIGS. 5A, 5B and 5C the storage case appears in an end view and in two sectional views. The holding frames 2,3 and the attachment of this to the front part and rear part of the base part 1 appear in more detail. The display elements 4,5 on both the front and the rear side of the storage case appear from the sectional views.

From FIG. 6A the storage case appears in a side view where the holding frames 2,3 appear and where the gripping area 13 is clearly visible. From FIG. 6B the holding frame 3 appear mounted on the base element 1 and holding the display element 5 between these two parts.

Figures 7A, 7B:
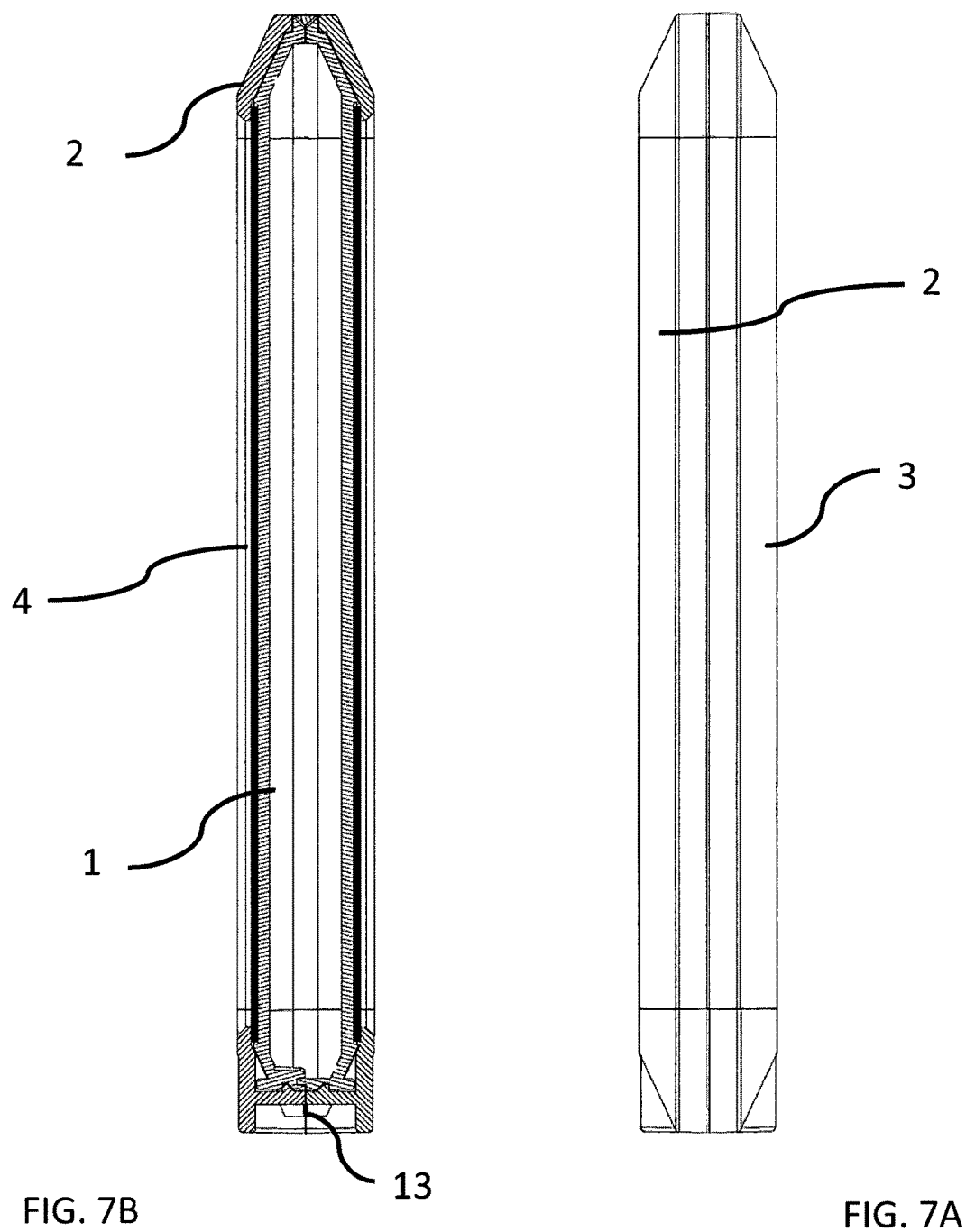
FIG. 7A and FIG. 7B shows a storage case according to the invention in an end view and further in a sectional view along the line F-F in FIG. 2.

From FIG. 7A the storage case appears in a side view where the holding frames 2,3 appear. From FIG. 7B the holding frame 2 appear mounted on the base element 1 and holding the display element 4 between these two parts. The gripping area 13 is also visible in this view.

Figure 8:
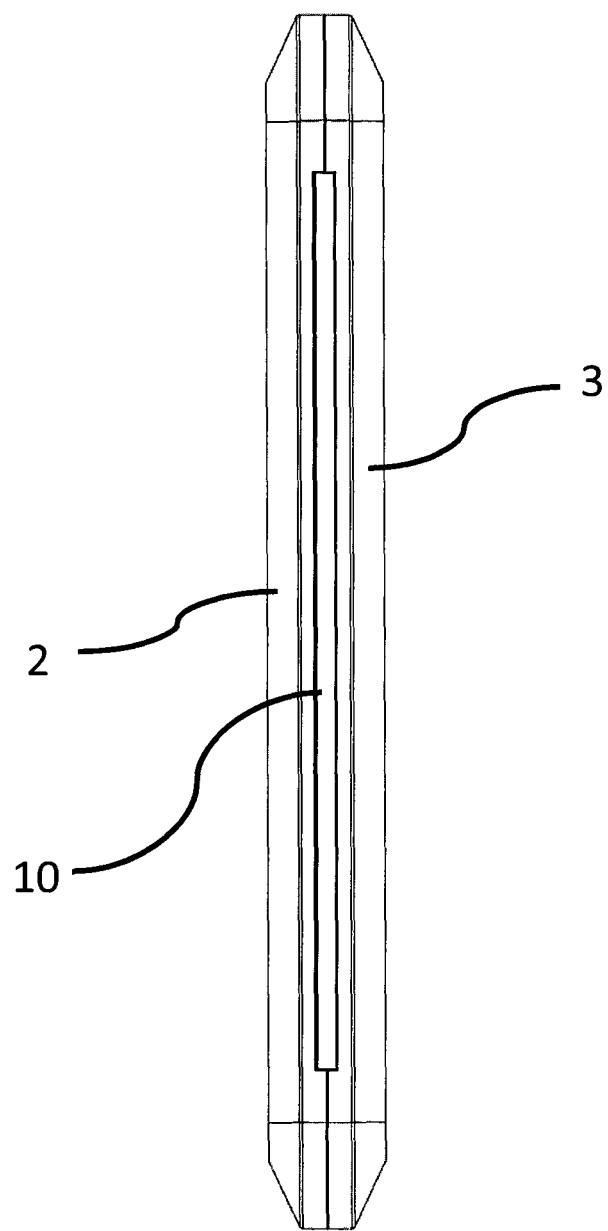
FIG. 8 shows a storage case in a back view.

From FIG. 8 the back part of the storage case appears and where the holding frames 2,3 are visible together with the connection hinge part 10 between the two side elements 8,9 of the base part 1.

Figure 9:
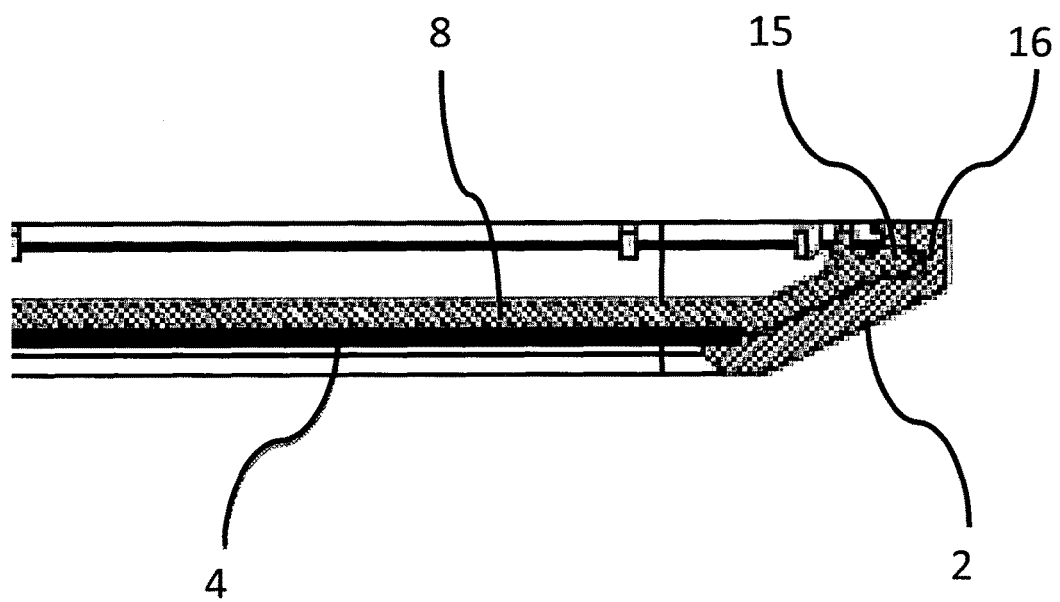
FIG. 9 shows an enlarged view of a connection between a base part and a holding frame.

FIG. 9 is an enlarged view of a detail of the cross sectional view seen in FIG. 5. The snap locking construction between the side element and the holding frame appears in more detail. It appears that the two parts comprises taps 15 and grooves 16 that correspond with each other and hence hold the two parts 8,2 together as a number of these taps 15 and grooves 16 are provided along the rim part of the side element and the holding frame, respectively. The opposite configuration of taps and grooves may be foreseen where the taps then would be on the holding frame.

The display element may have a number of different shapes corresponding to the shape of the central opening of the holding frame, however a rectangular shape will be the most preferred. The exact size will typically correspond to the shape of the central opening plus a marginal extra material and will obviously also depend of the actual size of the storage case as such. The central opening may have any shape and the display device may still have a rectangular shape. The display device may have a decoration on both sides, where the releasable holding frame may allow flipping of the display element to the alternative rear side. Alternatively an aperture in the base part side element may allow the decorated rear side of the display element to be visible from the inside of the storage case.

The holding frame is designed to extend over the edge of the storage case front part and here engage with the front part. The engagement is ensured through corresponding engagement means on the two parts, hereby enabling a snap connection. The connection is preferably releasable, hereby allowing a change of the display element, which may be relevant if a product stored in the storage case, after completion of the packaging process, is redirected to a different market with a different display element. Alternatively the holding frame may be permanently attached to the front part, e.g. by means of a gluing or welding process.

The holding frame may be an element with a plain surface, however the holding device further provides an opportunity for providing a decoration on the storage case with a limited effort in terms of the molding required for the holding frame compared to the entire storage case. Hence a more flexible storage case has also been provided.

The display element may be a simple print on a plain surface or may be more advanced prints, such as 3D images, holographic images on one or both sides or may be 3D vacuum formed surfaces where parts protrude as embossments from the otherwise plain surface. Even a transparent display element may be envisioned, where at the same time an aperture in the base element facing the display element will allow the product stored in the storage case to be visible from the outside. In the latter example a further decoration element may be placed under the transparent element and may be provided with an aperture corresponding to the aperture in the side element and hereby allow both a decoration and a view to the product enclosed in the storage case.

Although the invention in the foregoing is explained as a single side holding frame, is should be appreciated that a similar construction may be provided for the rear storage case part, and hereby providing a similar possibility for the exchange and diversifying of the display element in a storage case.

It should be appreciated that although one embodiment of the present invention is shown as a storage case for holding and storing a media disk in each side element, the storage case according to the invention may be formed without such holding means in the side elements, or may be equipped with other holding means for holding a different article. The nature of such holding means is not specified more detailed as these are not part of the invention. The individual elements of the total construction are subject to individual claims as the various parts may originate from different productions and afterwards be assembled at a different location.

The invention claimed is:

1. Storage case adapted for accommodation of retail goods, and comprising a base part having two side elements, each with an outer side and an inner side, where the two side elements of the base element are mutually connected along a side of the two elements by a hinge part, to be foldable to form a storage enclosure, where on at least one of the two side elements on the outer side a circumferential holding frame is provided connected with the side element and with a central aperture and where further a display element is positioned on the outer side of the at least one side element and interlocked between the outer side of the at least one side element and the holding frame connectable to the side element, where the holding frame and the storage case side element are mutually connected by means of a number of mechanical locking mechanisms, comprising a number of taps and grooves, preferably located on one side along the circumference of the outer side of the side element and on the other side on the holding frame.

2. Storage case according to claim 1, where the storage case side element comprises a number of taps and where the holding frame comprises a number of corresponding grooves adapted to accommodate the taps.

3. Storage case according to claim 1, where the interconnection between the storage case side element and the holding frame is releasable.

4. Storage case according to claim 1, where two holding frames are provided, one for each side element.

5. Storage case according to claim 1, where on the inner side of at least one of the two side elements one or more holding elements are provided.

6. Storage case according to claim 1, where on the inner side of at least one of the two side elements one or more holding clips are provided, adapted for spring action fixation of an inlay material.

7. Storage case according to claim 2, where the interconnection between the storage case side element and the holding frame is releasable.

8. Storage case according to claim 2, where two holding frames are provided, one for each side element.

9. Storage case according to claim 3, where two holding frames are provided, one for each side element.

10. Storage case according to claim 2, where on the inner side of at least one of the two side elements one or more holding elements are provided.

11. Storage case according to claim 3, where on the inner side of at least one of the two side elements one or more holding elements are provided.

12. Storage case according to claim 4, where on the inner side of at least one of the two side elements one or more holding elements are provided.

13. Storage case according to claim 2, where on the inner side of at least one of the two side elements one or more holding clips are provided, adapted for spring action fixation of an inlay material.

14. Storage case according to claim 3, where on the inner side of at least one of the two side elements one or more holding clips are provided, adapted for spring action fixation of an inlay material.

15. Storage case according to claim 4, where on the inner side of at least one of the two side elements one or more holding clips are provided, adapted for spring action fixation of an inlay material.

16. Storage case according to claim 5, where on the inner side of at least one of the two side elements one or more holding clips are provided, adapted for spring action fixation of an inlay material.

* * * * *